Oct. 6, 1936.   H. L. ALLEN   2,056,160
VALVE ELEMENT AND METHOD OF FORMING THE SAME
Filed Feb. 14, 1931   2 Sheets-Sheet 1

INVENTOR:
HARRY L. ALLEN
BY George W. Saywell
ATTORNEY.

Oct. 6, 1936.    H. L. ALLEN    2,056,160
VALVE ELEMENT AND METHOD OF FORMING THE SAME
Filed Feb. 14, 1931    2 Sheets-Sheet 2
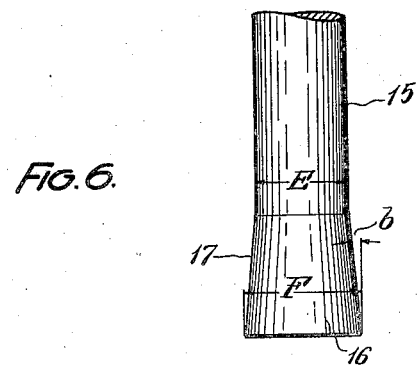
FIG.6.
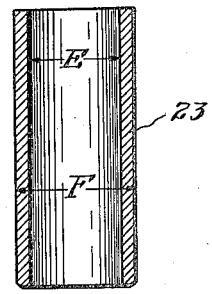
FIG. 7
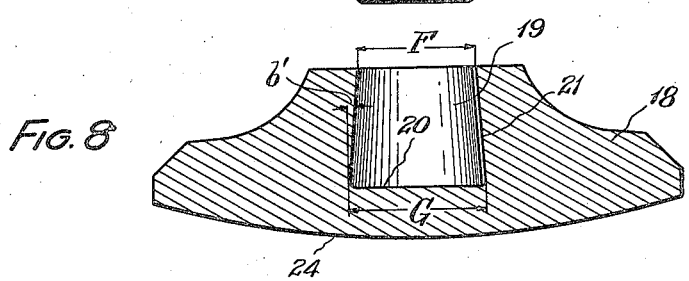
FIG. 8
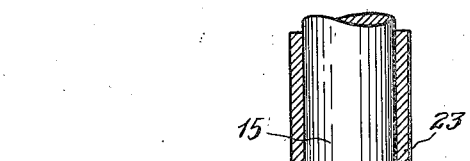
FIG. 9
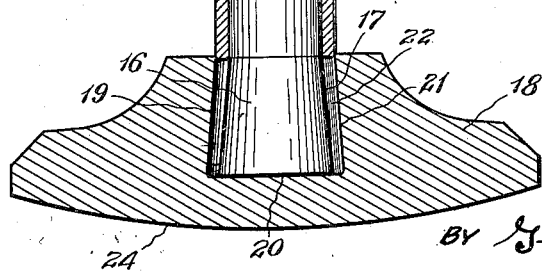
INVENTOR:
HARRY L. ALLEN
BY George W. Saywell
ATTORNEY.

Patented Oct. 6, 1936

2,056,160

UNITED STATES PATENT OFFICE 2,056,160

VALVE ELEMENT AND METHOD OF FORMING THE SAME

Harry L. Allen, Cleveland, Ohio, assignor to The Bruce-Macbeth Engine Company, Cleveland, Ohio, a corporation of Ohio Application February 14, 1931, Serial No. 515,723

18 Claims. (Cl. 123—188)

The invention particularly relates to valve elements whose respective parts are secured together in such a manner as to obviate loosening in service, and which when impaired by wear, oxidation, corrosion, heat or other conditions or results of service, can be practicably separated, and the unimpaired parts incorporated with replacement parts for those impaired and removed. The invention also particularly relates to improved methods of forming valve elements having such characteristics.

The invention is adaptable to a wide field of articles and methods of forming the same, particularly where such articles consist wholly or in part of two or more metal members which should be securely locked together. I have set forth the invention in the accompanying drawings and the following description by reference to the structure and methods of making an exhaust valve for gas engines, and a seat for such exhaust valve, but the invention is applicable to other structures, such as bushings and means for holding the same in position.

The annexed drawings and the following description set forth in detail certain steps illustrating the carrying out of my new and improved method and certain elements produced by the method, such disclosed steps and elements constituting, however, but two of the various series of steps by which the method may be worked and but two of the various forms of elements produced by such method steps.

In said annexed drawings:

Figure 1 is a fragmentary axial section of a cylinder head, taken through a recess therein adapted to receive the exhaust valve seat member, this recess being of frustro-conical form and extending from the inside surface of the cylinder head downwardly a certain distance in axial alignment with the valve outlet but of larger cross-section than said outlet so as to form a shoulder, hereinafter fully described, against which the base of the valve seat member is secured;

Figure 6 is a fragmentary elevation of a valve stem formed in a manner adapting it for connection with a suitable valve head member to form the improved valve head element of my invention;

Figure 7 is an axial section of a locking shell adapted to rigidly secure together the valve head member and the valve stem;

Figure 5:
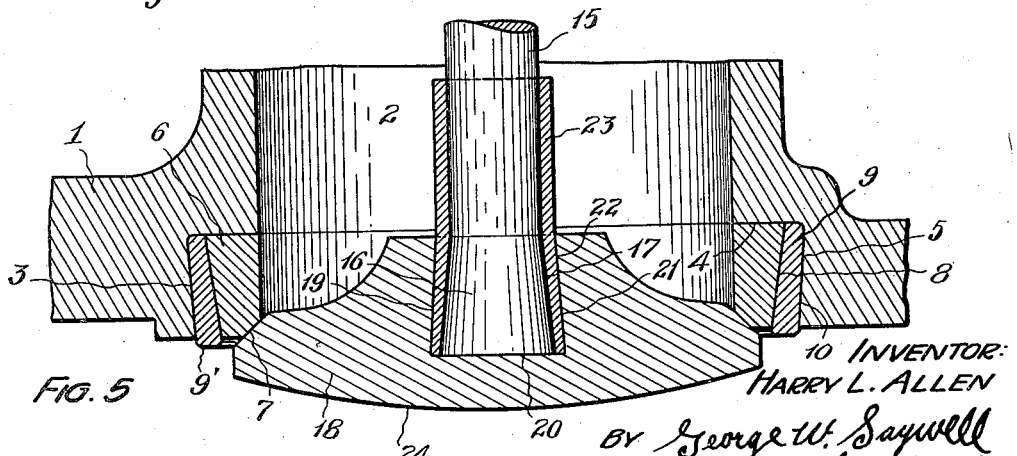
Figure 5 is a vertical section of the completed valve seat element, also showing a fragmentary section of a valve head member cooperating with the valve seat member, this valve head member and its valve stem, also shown, being of a structure and secured together in a manner corresponding to my invention, this adaptation of the invention being more particularly shown in Figures 6, 7, 8, and 9.

Figure 8 is a vertical section of a valve head member suitably formed with a recess to cooperate with the stem and locking member shown in Figures 6 and 7, respectively; and Figure 9 is a fagmentary vertical section of the valve head assembly at that stage when the valve stem has been placed within the recess in the valve head member and the locking shell is in position ready to be forced into the space between the recess wall and the valve stem, whereby the stem and valve head member will be securely locked together, as shown in Figure 5.

Figure 1:
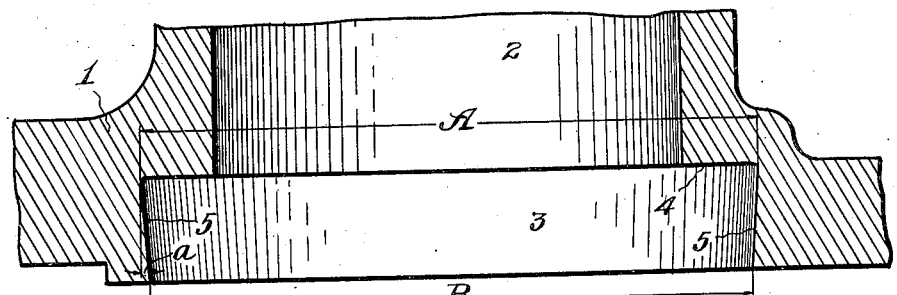
Figure 4:
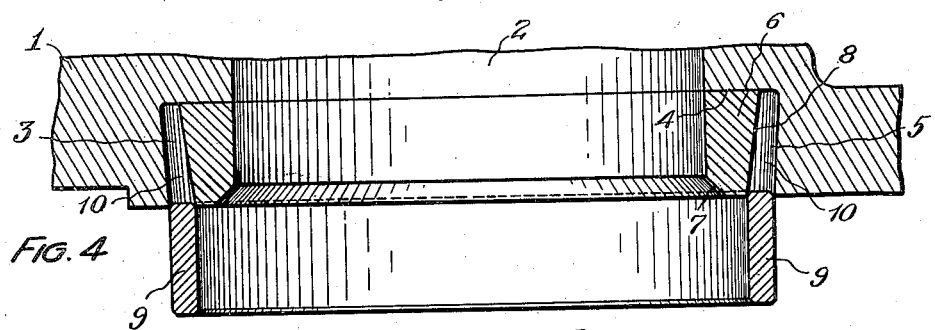
Figure 4 is a vertical section of the valve seat assembly when the valve seat member has been placed within the cylinder head recess and the locking ring is in position ready to be driven or forced into the space between the recess wall and the valve seat member so as to securely lock these two members together.

Referring to the annexed drawings in which the same parts are indicated by the same respective numbers in the several views, a cylinder head 1, Figure 1, which may be made of cast iron, cast steel or other suitable material, is formed with the outlet 2 for hot exhaust gases, the inner or cylinder end portion 3 of this outlet 2 being of greater diameter than the balance of the outlet so as to provide a shoulder 4 at the base of the outlet portion 3. I shall refer to this outlet portion 3 as a recess. The wall 5 of the recess 3 is inclined downwardly and outwardly so that the diameter of the recess 3 at its base is greater than its diameter at the top or cylinder end. In practice, when making an exhaust valve seat element of the character shown in Figures 1 and 5, for instance, this inclination of the wall 5 might be preferably about 4° from a line parallel with the axis of the recess 3. This is indicated in Figure 1 by the angle $a$. A valve seat member 6, preferably cast iron, having a valve seating surface 7, is formed with an outwardly and downwardly inclined exterior peripheral surface 8, i. e., it has a conical exterior surface, the inclination of which is preferably somewhat greater than the inclination of the wall 5 of the recess 3; for instance, 5° from a line parallel with the axis of the seat member 6, as indicated by the angle a', Figure 2. The initial disposition of the seat member 6 in the recess 3, in the process of uniting the valve seat parts, is indicated in Figure 4, wherein it will be noted that an annular locking ring 9, preferably of steel, and of a wall thickness substantially equal to one-half the difference between the top diameters of the recess 3 and valve seat member 6 is in position to be driven or forced into space 10 between the wall 5 of the recess 3 and the exterior surface 8 of the valve seat member 6.

Figure 2:
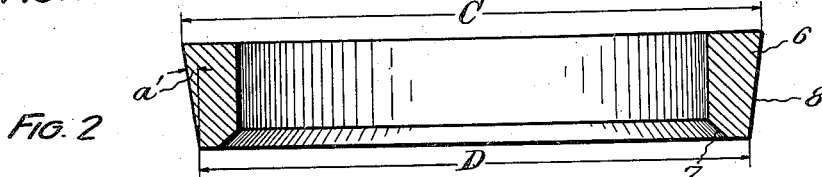
Figure 2 is a vertical section of the valve seat member.
Figure 3:
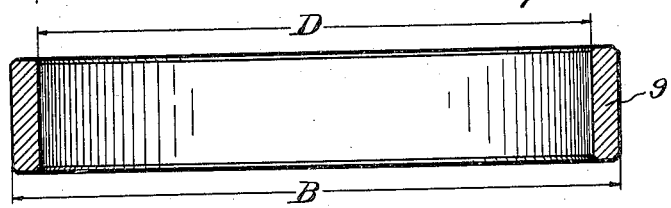
Figure 3 is a vertical section of a ring for locking the valve seat member of Figure 2 in the cylinder head recess of Figure 1.

The preferable comparative dimensions of the several members thus far described are indicated in Figures 1, 2, and 3, wherein it will be noted that "A" indicates the diameter of the bottom of the recess 3, and "B", a smaller distance than "A", indicates the diameter of the top of the recess 3, this distance "B" also being substantially the over-all diameter of the locking ring 9. "D" indicates the inside diameter of the locking ring 9 and is substantially equal to the over-all diameter of the top of the seat member 6. The over-all base diameter of the seat member 6 is indicated by the distance "C" and this distance, in the form of construction shown in Figures 1 to 5, is less than the outer diameter "B" of the recess 3 but greater than the inner diameter "D" of the locking ring 9. From the description and the accompanying drawings, it is evident that the space 10 between the wall 5 of the recess 3 and the surface 8 of the seat member 6 tapers downwardly and outwardly, as indicated in Figure 4, and the relative dimensions "A", "B", "C" and "D" are so selected that this space gradually decreases in cross-sectional area from top to bottom. In other words, this space 10 is bounded by conical surfaces which have different conical angles. By conical angle is meant the angle of inclination of a conical surface relative to its axis.

When the locking ring 9 is forced into the space 10, it is compressed so that its thickness decreases as it approaches the shoulder 4. Thus a wedging action of the locking ring 9 takes place and the seat member 6 is somewhat reduced in diameter and is increasingly forced against the shoulder 4. The result, of course, is to unite the several members 1, 6 and 9 with a wedge lock. The exhaust valve seat member as thus united with the cylinder head is shown in Figure 5, wherein is also shown an improved valve head element adapted to cooperate with this seat member, the stem and head of this improved valve head element being also united by my improved process into an improved valve structure which will be hereinafter fully described by reference to Figures 6 to 9. Preferably, the locking ring 9 projects somewhat above the free end of the seat member 6, as indicated by 9', Figure 5, which permits subsequent upsetting of the locking ring 9 or the caulking of the seat ring 6, if the latter becomes loosened under duty.

Certain facts will be evident from the foregoing description and the accompanying drawings of which some will now be stressed. By the method practiced, a cylindrical locking ring 9 is forced into a tapered annular space, this space having conical lateral surfaces. The annular space is larger in cross-sectional area at the top than it is at the bottom, but its mean diameter at the top is smaller than at any point below the top and is largest at the bottom. The circular locking ring becomes wedge-shaped in section as it is driven into the annular space, due to the spreading to which it is subjected and, furthermore, its body is compressed so that when assembled it is of gradually decreasing cross-sectional area from top to bottom. All effort to assemble the parts of the element, whether by pounding or pressing, causes the seat member 6 to move more tightly upon the shoulder 4. Heating of the seat member 6, under duty, tends to force the seat member 6 more tightly upon the shoulder 4 at the bottom of the recess 3 due to the tapered surface 8. The assembly provides an improved mounting for a valve seat member which is of different material than the balance of the seat mounting, permits renewing of the seat member by the removal of the seat member and the locking ring and their replacement, provides for a very secure locking together of the several members in a structure in which the valve seat member is renewable, and provides an assembly which to an unusual degree withstands pounding and temperature changes without material deterioration. Obviously, the material of which locking member 9 may be made should be such that the locking member will keep the valve seat member locked to the cylinder head under all conditions of normal use.

Referring now to the embodiment of this invention in the valve head element, a valve stem 15, Figure 6, preferably of steel construction, is formed with an end portion 16 having an outwardly and downwardly inclined outer surface 17 making an angle with a line parallel to the axis of the stem, which angle may be substantially 5°, indicated by the angle b. This valve stem portion 16 is designed to be accommodated in a recess 19 formed in an iron valve head member 18 having a seating surface 7 adapted to engage and be engaged by the seating surface 7 of the seat member 6, the bottom 20 of the recess providing a shoulder against which the base of the stem portion 16 abuts. This head recess 19 also increases in diameter downwardly, as indicated by its inclined wall 21, the amount of inclination from a line parallel to the axis of the recess 19 being indicated by the angle b', an angle which is preferably somewhat less than the angle b, Figure 6, or an angle of substantially 4°, when an angle of 5° is formed on the end portion of the stem 15. Preferably, the base of the stem end portion 16, indicated by "F", is made of its maximum possible diameter, i. e., substantially the same as the smallest or outer diameter of the recess 19, so that said stem end portion 16 can be forced into the recess 19 with a tight fit at the top or outer end of the recess. It is evident that, when the portion 16 is inserted in the recess 19, there will be a space 22 between the wall 21 and the surface 17 and that this space will have conical surfaces which have different angles of inclination and that the cross-sectional area of the space will decrease in width from top to bottom. This space 22 is filled by a cylindrical steel locking shell 23, Figure 7, having an over-all diameter "F" preferably equal to the outer diameter of the recess 19. In practice, I prefer to make the outside diameter "F" of the locking sleeve 23 equal to the inside diameter of the top of the recess 19, so that this recess will be completely filled to the top. The normal diameter "E" of the stem 15 is equal to the inside diameter of the locking sleeve 23, and the bottom diameter "G" of the recess 19, of course, is greater than the top diameter "F" thereof. The diameters "E", "F" and "G" are so selected that the cross-sectional area of the space 22 in the plane of the bottom of the recess 19 is less than the cross-sectional area of this space in the plane at the top of the recess. Therefore, this locking shell 23 can be driven or forced into the space 22 and will have the thickness of its wall decreased by compression as it penetrates the space 22. Thus the members 18, 23 and 16 are rigidly locked together by the wedging action and the valve head element is complete, as shown in Figure 5.

In the valve form of the invention shown in Figures 6, 7, 8, and 9, the engagement of the locking shell 23 with the head member 18 and stem portion 16 is tightest at the bottom of the recess 19; in fact, it is extremely tight in the entire lower half of the recess 19. It is evident that the greatest pressure upon the valve head member 18, under duty, is against the surface 24 thereof and that the construction provides the greatest strength in the valve head member in this area, which area is also the best adapted to withstand the greatest stress of the locking sleeve 23 on the head member. Furthermore, the side thrust on the head member 18 by the locking sleeve is least at its inner portion where the cast iron head member is weakest. The thrust to open the valve in service is exerted against the shoulder 29 forming the bottom of the recess 19. The stem connecting portion 16 does not extend entirely through the head member 18 so that there is no possibility of the escape of gases between the stem and head member. In other words, in this composite head member and stem, the head portion is entirely closed against the escape of gases on that side which is exposed to the pressure of the outgoing hot exhaust gases. The locking sleeve 23 extends upwardly a material distance around the stem 15, as will be clearly seen in Figure 5, thus protecting the stem 15 against cutting action by the hot exhaust gases. Also, this construction strengthens the stem 15 in the section where it leaves the head member 18. If the head member 18 should work loose, it can be tightened by forcing or driving the locking sleeve 23 more tightly into the space 22. When the head member 18 becomes worn to an extent not warranting further service, it can be removed together with the locking sleeve 23, and a new head member and locking sleeve mounted on the same stem 15. This possibility is a very important consideration in the case of large valves where the stem is comparatively long and represents expensive machine-work at the end opposite the valve end.

What I claim is:

1. A poppet valve element consisting of a head member formed with a surface recess whose lateral wall is in the surface of a cone which inclines outwardly in the direction of the base of the recess, a stem extending outwardly of said recess and having an enlarged end portion contained in the recess, the periphery of said stem end portion being also in the surface of a cone which inclines outwardly in the direction of the base of the recess, said stem member being co-axial with said recess and spaced from said lateral wall, and a locking sleeve engaging said recess wall and the periphery of said stem end portion and extended outwardly around the stem extension.

2. A poppet valve element consisting of a head member formed with a surface recess whose lateral wall is in the surface of a cone which inclines outwardly in the direction of the base of the recess, a stem extending outwardly of said recess and having an enlarged end portion contained in the recess, the periphery of said stem end portion being also in the surface of a cone which inclines outwardly in the direction of the base of the recess, said stem member being co-axial with said recess and spaced from said lateral wall, and a locking sleeve tightly interlocking said recess wall and the periphery of said stem end portion and reinforcing the stem in the section where it leaves said recess.

3. A poppet valve element comprising an outer member having a recess formed with a base and an undercut wall of frustro-conical form, an inner member formed with an outer frustro-conical surface co-axial with said undercut wall and having a conical angle larger than that of said undercut wall, said inner member abutting said base and being spaced from said undercut wall, and a locking ring interlocking said inner and outer members, the end of said said ring toward said base having a very tight fit with the opposed frustro-conical surfaces of said inner and outer members and the portion of the ring near the mouth of said recess having a less tight fit with the opposed frustro-conical surfaces than the base end of said ring.

4. A poppet valve element comprising a valve head member having a surface recess formed with a closed base and an undercut wall of frustro-conical form, a stem member having an enlarged end abutting said base and formed with a frustro-conical surface within said recess and spaced from the undercut wall thereof, and substantially rigid means positioned between and interlockingly engaged with the frustro-conical surfaces of the recess and of the stem member, said means extending outwardly from said recess around said stem member.

5. A poppet valve seat element comprising an outer rigid member formed with a recess having a stop shoulder, an inner rigid member within said recess and abutting said shoulder, the opposed walls of said recess and said inner member being so formed as to define an annular space of variable width, and a substantially rigid uniformly thick locking ring driven and distorted into and filling said annular space, said locking ring extending somewhat above said inner and outer members to provide for ready peening of the ring during service subsequent to assembly of the valve seat element.

6. A poppet valve element having a seating surface adapted to engage a cooperating valve seating surface and comprising an outer member formed with a recess having a base and an undercut wall, an inner member fitting in said recess in contact with said base and having an outer wall substantially similar to said undercut wall but spaced therefrom, and a locking member completely filling and tightly fitting in the space between said walls, and having close continuous peripheral contact with said walls throughout the depth of said recess, the material and size of said locking member being such that it will have a sufficiently high resistance to change of form as to maintain said outer and inner members securely locked together when subjected repeatedly to such pounding and such changes in temperature as are encountered by poppet valve elements in internal combustion engines and the like.

7. A poppet valve element having a seating surface adapted to engage a cooperating valve seating surface and comprising an outer member formed with a recess having a base and walls sloping downwardly and outwardly toward said base, an inner member fitting in said recess in contact with said base and having outer walls sloping downwardly and outwardly less steeply than the recess walls but spaced therefrom throughout their height, and an annular locking member tightly fitting in the space between said walls of the inner and outer members and having close continuous peripheral contact with said walls, the end of said locking member toward said base fitting much more tightly between said walls than the portion of the locking member near the mouth of said recess, the material and size of said locking member being such that it has a sufficiently high resistance to change of form as to maintain said outer and inner members securely locked together when subjected repeatedly to such pounding and such changes in temperature as are encountered by poppet valve elements in internal combustion engines and the like.

8. A poppet valve element according to claim 7 and in which said recess walls are symmetrically arranged with respect to an axis passing through the center of said recess and have a slope forming an angle of about 4° with said axis.

9. A poppet valve element according to claim 7 and in which said locking member after assembly projects out of said recess to provide for ready peening of said locking member to overcome any looseness which may develop in service.

10. A poppet valve element having a seating surface adapted to engage a cooperating valve seating surface and comprising an outer member formed with a recess having a base and walls sloping downwardly and outwardly toward said base, an inner member fitting in said recess in contact with said base and having outer walls substantially similar to the walls of said recess but spaced therefrom, and an annular locking member fitting tightly in the space between said walls of the inner and outer members and having close continuous peripheral contact with said walls, the end of said locking member toward said base fitting more tightly between said walls than the portion of the locking member near the mouth of said recess, the material and size of said locking member being such that it has a sufficiently high resistance to change of form as to maintain said outer and inner members securely locked together when subjected repeatedly to such pounding and such changes in temperature as are encountered by poppet valve elements in internal combustion engines and the like.

11. In a poppet valve element of an internal combustion engine or the like, an outer rigid member formed with a recess having a base and continuous undercut walls, an inner rigid member in said recess and abutting said base, said inner member having continuous outer walls sloping downwardly and outwardly toward said base, and a continuous locking ring completely filling the space between the opposed continuous walls of said inner member and of said recess and forming a fluid-tight joint with said inner and outer members near the base end portion of said ring.

12. In a poppet valve element of an internal combustion engine or the like, an outer rigid member formed with a recess having a base and continuous undercut walls, an inner rigid member having continuous outer walls sloping downwardly and outwardly toward said base and entirely spaced from the undercut walls of the recess, and a continuous locking member completely filling the space between the opposed continuous walls of said inner member and of said recess and forming a fluid-tight joint with said inner and outer members, said locking member having a tighter and closer contact with said opposed continuous walls toward the base of the recess than toward the mouth of the recess.

13. In an internal combustion engine or the like, a poppet valve seat element comprising an outer rigid member formed with a recess having a base and undercut frustro-conical walls, an inner rigid annular member in said recess and abutting said base, said inner member having frustro-conical outer walls spaced from the undercut walls of said recess and sloped less steeply than said undercut walls and having a seating surface sloped downwardly and inwardly for cooperation with the seating surface of a poppet valve head element, and a locking ring completely filling the space between the opposed frustro-conical walls of said inner member and of said recess and forming a fluid-tight joint with said inner and outer members, the end portion of the locking ring near the base of said recess having a tighter and closer contact with the frustro-conical walls of said inner member and of said recess than the portion of the locking ring near the mouth of said recess.

14. A poppet valve head element having a seating surface adapted to engage a cooperating valve seating surface and comprising a head member formed with a recess having a base and an undercut wall, a stem member fitting in said recess in contact with said base and having an outer wall substantially similar to said undercut wall but spaced therefrom, and a locking member completely filling and tightly fitting in the space between said walls and having close continuous peripheral contact with said walls throughout the depth of said recess, the material and size of said locking member being such that it will have a sufficiently high resistance to change of form as to maintain said head member and said stem member securely locked together when subjected repeatedly to such pounding and such changes in temperature as are encountered by poppet valve elements in internal combustion engines and the like.

15. A poppet valve seat element having a seating surface adapted to engage a cooperating valve seating surface and comprising an outer member formed with a recess having a base and an undercut wall, a seat member fitting in said recess in contact with said base and having an outer wall substantially similar to said undercut wall but spaced therefrom, and a locking member completely filling and tightly fitting in the space between said walls and having close continuous peripheral contact with said walls throughout the depth of said recess, the material and size of said locking member being such that it will have a sufficiently high resistance to change of form as to maintain said outer member and said seat member securely locked together when subjected repeatedly to such pounding and such changes in temperature as are encountered by poppet valve elements in internal combustion engines and the like.

16. A poppet valve element comprising an outer rigid member formed with a recess having a base, an inner rigid member within said recess and abutting said base, the opposed walls of said recess and said inner member being so formed as to define an annular space of variable width, and a substantially rigid uniformly thick locking ring driven and distorted into and filling said annular space.

17. A poppet valve element consisting of a head member formed with a surface recess whose lateral wall is in the surface of a cone which inclines outwardly in the direction of the base of the recess, a stem member whose periphery is also in the surface of a cone which inclines outwardly in the direction of the base of the recess, said cone surfaces having different conical angles, and said stem member being co-axial with said recess and spaced from said lateral wall, and a locking sleeve engaging said recess wall and the periphery of said stem member.

18. A poppet valve element comprising an outer rigid member formed with a recess having a base, an inner rigid member fitting in said recess and abutting said base, the opposed walls of said recess and said inner member being so formed as to define an annular space of variable width, and a substantially rigid locking ring driven and distorted into and filling said annular space, said locking ring before assembly into said annular space being thicker, in any section lying after assembly in any horizontal plane between the base of said recess and a horizontal plane near the mouth thereof, than the width of the corresponding part of said annular space.

HARRY L. ALLEN.